(12) United States Patent
Simpson et al.

(10) Patent No.: US 7,241,476 B2
(45) Date of Patent: Jul. 10, 2007

(54) AIRFLOW MASKING OF CARBON-CARBON COMPOSITES FOR APPLICATION OF ANTIOXIDANTS

(75) Inventors: Allen H. Simpson, Buchanan, MI (US); Richard W. Smith, Marcellus, MI (US); Marcia A. Wright, Niles, MI (US); Phillip D. Johnson, Niles, MI (US); David R. Cole, North Liberty, IN (US)

(73) Assignee: Honeywell International Inc., Morristown, NJ (US)

( * ) Notice: Subject to any disclaimer, the term of this patent is extended or adjusted under 35 U.S.C. 154(b) by 169 days.

(21) Appl. No.: 10/942,222

(22) Filed: Sep. 16, 2004

(65) Prior Publication Data
US 2006/0057289 A1    Mar. 16, 2006

(51) Int. Cl.
*B05D 1/32* (2006.01)
(52) U.S. Cl. .................................. 427/282; 427/287
(58) Field of Classification Search ................ 427/282, 427/287
See application file for complete search history.

(56) References Cited

U.S. PATENT DOCUMENTS

| | | |
|---|---|---|
| 3,607,553 A | 9/1971 | Fritzsche |
| 3,866,567 A | 2/1975 | Fritzsche |
| 4,940,012 A | 7/1990 | Zimmerman et al. |
| 5,175,018 A | 12/1992 | Lee et al. |
| 5,686,144 A | 11/1997 | Thebault et al. |
| 5,824,366 A * | 10/1998 | Bose et al. .................. 427/239 |
| 6,332,926 B1 * | 12/2001 | Pfaendtner et al. .......... 118/721 |
| 6,726,753 B2 | 4/2004 | Koucouthakis et al. |

FOREIGN PATENT DOCUMENTS

| | | |
|---|---|---|
| DE | 101 55 901 A1 | 5/2003 |
| EP | 0 495 583 A1 | 7/1992 |

* cited by examiner

*Primary Examiner*—Fred J. Parker
(74) *Attorney, Agent, or Firm*—Birch, Stewart, Kolasch & Birch, LLP

(57) ABSTRACT

Mask (10, 10', 21, 22) for use in coating a carbon-carbon composite brake disc (25) with anti-oxidant. The mask is composed of carbon-carbon composite material or nonreactive ceramic material. The mask is configured with edge ridges (11, 13) that are aligned with the outer and inner annular diameters of the carbon-carbon composite brake disc, a gasflow channel (12) between the ridges, and a gas access port (18) that allows gas to enter the gasflow channel. The mask may also include a gas exit port (16) having a valve (17) operatively connected thereto, so that gas flow may be restricted when pressure within the mask and carbon-carbon composite brake disc falls below a specified minimum value. Also, a method of avoiding application of liquid antioxidant material to a friction surface of a carbon-carbon composite brake disc, by: covering the friction surface with a mask configured to deliver compressed gas to the friction surface, and directing compressed gas across the friction surface and through pores in the carbon-carbon composite brake disc and/or in the mask while the masked brake disc is in the presence of the antioxidant material in a liquid state.

13 Claims, 7 Drawing Sheets

AIRFLOW MASKING OF CARBON-CARBON COMPOSITES FOR APPLICATION OF ANTIOXIDANTS

FIELD OF THE INVENTION

The present invention is directed to a reliable fixture and methodology used to apply a liquid coating to a porous material and to dry that coating in a fast and efficient manner such that it covers only the desired surfaces of the porous material. This invention thus provides a simple, low cost and effective method to prevent application of antioxidant to the friction surfaces of carbon-carbon composite brake discs. In accordance with the present invention, a non-reactive mask is created for the brake disc. A positive airflow is introduced through the mask into the friction surface. The air flows out at the mask-disc interface and through the pores of the brake disc. This prevents antioxidant from reaching friction surfaces where it could modify friction efficacy.

BACKGROUND OF THE INVENTION

Certain porous materials need to have liquid coatings applied. Difficulties arise if the coatings are to be applied only to part of the porous material, because transport of the liquid through the porous material will occur. The liquid will then be in regions where the presence of the liquid or its residue is undesirable. An example of this is a carbon-carbon composite brake disc, where liquid anti-oxidant material should be applied only to the non-friction surfaces and must not contaminate the friction surfaces.

Brake discs that operate at high temperatures, such as those used in commercial and military aircraft, should be manufactured from materials having high heat resistance and long wear characteristics. Such brake discs normally operate at temperatures that exceed 1300° F. and can reach 2000° F. Such brake discs are commonly made of carbon-carbon composite materials. However, carbon can oxidize at elevated temperatures, which can cause disc weakening and can lead to structural damage and/or reduction of brake disc life.

Anti-oxidants are usually applied to the carbon surfaces to protect carbon-carbon composite brake discs from oxidation, maintain disc strength, and avoid early disc failures. Anti-oxidants can affect the friction and wear characteristics of the disc, and thus extreme care is required to prevent the anti-oxidant coating from reaching the friction surfaces. Heavy anti-oxidant coating may be necessary for discs operating at temperatures exceeding 1000° F., which may require several repetitions of the coating procedure, thus increasing cost. The available methods to apply the anti-oxidant to the non-friction surfaces of a carbon-carbon composite disc include manual or robotic techniques with possible masking of friction surfaces, which can be slow, inefficient, and costly. In addition, these methods are ineffective because the carbon-carbon composite material may have an open pore structure that will promote transport of the liquid anti-oxidant materials to the friction surfaces.

For instance, U.S. Pat. No. 5,686,144 describes a process in which a friction face of a brake disc is masked by a plate to isolate and seal the exterior from liquids. The plate is a fluid-tight plate. In order to achieve fluid-tightness, the plate may have annular grooves near its inner and outer circumferences, with rubber O-rings located in the grooves. See FIG. 5 of the patent. Alternatively, the faces of the plates that are turned towards the discs may be provided with elastic beads or edges of molded rubber. See FIG. 6 of the patent. In another variation, the plates may be constituted by elastically deformable sheets, for example of rubber. See FIG. 7 of the patent. The patent teaches that it is also possible to seal the friction faces by forming a surface coating that can subsequently be peeled off. The masked disc is immersed in a bath of impregnating composition containing a substance that can form a protective layer against oxidation. Impregnation is effected by establishing a pressure difference between the pressure at the exterior of the exposed surfaces of the immersed brake disc and the pressure inside the internal open pore space of the brake disc. This forces the impregnating composition to penetrate into the internal open pore space of the disc to form an internal oxidation protection.

SUMMARY OF THE INVENTION

The present invention involves protecting the friction surface of a carbon-carbon composite brake disc with a mask. In this invention, the mask matches the edges of the friction surface, but it does not create a seal with the disc. The carbon-carbon composite disc may be sandwiched between two masks to protect friction surfaces on both sides of the disc. Both the target material and the masks are then dipped in a bath of coating. While immersed and until the coating is dried, compressed air or other gas is forced into the assembly and out through open pores in the target material and the gaps at the interface between the target material and the mask material. This prevents the liquid anti-oxidant from being transported to the friction surfaces. The flow of gas is maintained until the coating is dry and thus immobilized. This approach improves upon current coating techniques by proving a fast, reliable, and relatively inexpensive method to apply the coating material to only the non-friction surfaces of a carbon-carbon composite disc.

One embodiment of the present invention is a method that enables the application of a liquid coating material to only selected surfaces of a solid material. The method involves applying the liquid coating material to the solid material and subsequently drying the treated solid material while directing compressed gas across the surfaces of the solid material that are to be kept free of the coating material. In use, the gas is normally compressed to less than 20 psi. The gas is supplied, for instance, at a rate of 0.2–2.0 cubic feet per minute. In this invention, the compressed gas is directed by means of a mask. Normally, at least one of the material and the mask is porous. In a particularly preferred embodiment, the mask is composed of porous carbon-carbon composite material, the solid material to be coated is a porous carbon-carbon composite brake disc, and the liquid coating material is an antioxidant. The gas is supplied at a volume-rate sufficient to maintain air velocity through the pores and through an interface between the mask and the solid material during the application and drying of the liquid coating material. The compressed gas may be heated, e.g. to a temperature in the range of 100–350° C., in order to speed the drying (curing) of the liquid coating material.

A preferred embodiment of the invention is method of avoiding application of liquid antioxidant material to a friction surface of a carbon-carbon composite brake disc. This method embodiment includes the steps of covering the friction surface with a mask configured to cover the friction surface with compressed gas, and directing compressed gas across the friction surface and through an interface between the carbon-carbon composite brake disc and the mask and through pores in the carbon-carbon composite brake disc and/or in the mask while the masked brake disc is in the presence of the antioxidant material in a liquid state. The compressed gas may be heated prior to directing it across the friction surface and through the disc/mask interface and the pores. Prior to this heating step, the pressure of the gas may be reduced from a pressure of 20–180 psi to a pressure of less than 20 psi.

Another embodiment of the present invention is mask for coating a carbon-carbon composite brake disc. This mask may be composed of carbon-carbon composite material or nonreactive ceramic material. The mask may but need not have an open pore structure The mask may be configured with (i) edge ridges that are aligned with the outer and inner annular diameters of the carbon-carbon composite brake disc, (ii) a gasflow channel between said ridges, and (iii) a gas access port that allows gas to enter said gasflow channel. The mask may have a gas exit port having a valve operatively connected thereto that allows restriction of gas flow when pressure within the mask and carbon-carbon composite brake disc falls below a specified minimum value.

BRIEF DESCRIPTION OF THE DRAWINGS

The present invention will be more fully understood from the detailed description given hereinbelow, and from the accompanying drawings. The drawings, which are in general not to scale, are provided by way of illustration only, and should not be construed as limiting the present invention.

DETAILED DESCRIPTION OF THE INVENTION

Figure 1A:
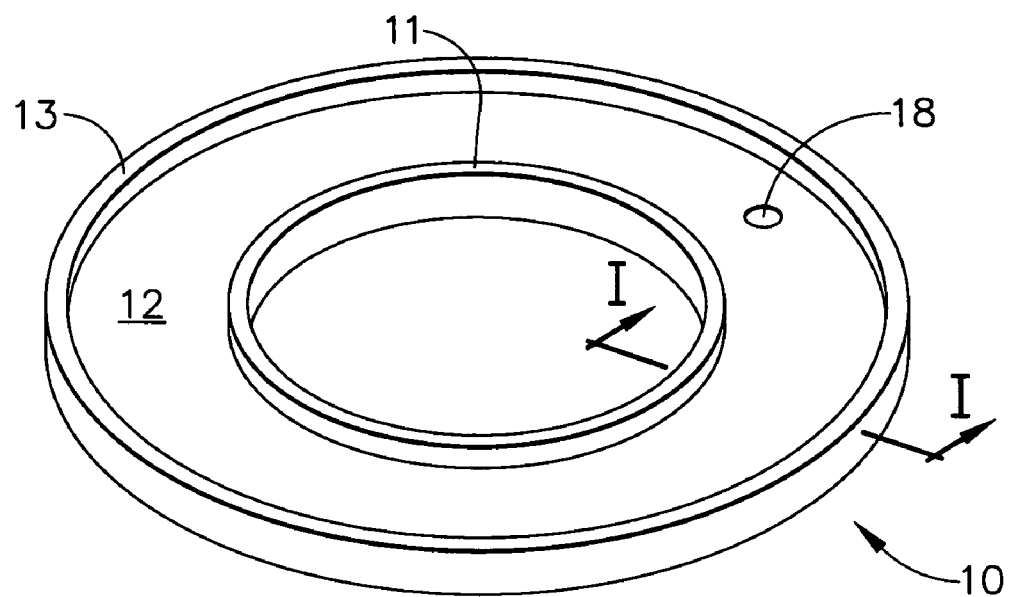
FIGS. 1A, 1B, 1C, and 1D show perspective views of typical mask pieces of the present invention.

The present invention provides a process by which a durable and effective oxidation protection can be applied to the non-friction surfaces of a carbon-carbon composite brake disc without altering the tribological characteristics of the materials in the friction portions of the disc. The process of this invention comprising masking each friction face of a brake disc to isolate it from the exterior from liquids, and immersing the brake disc in a bath containing an impregnating composition containing at least one substance which can form a protective layer against oxidation.

In accordance with the present invention, a carbon-carbon composite mask may be created for each friction surface of a disc. The mask is designed to match the edges of the friction surface, but it is not intended to create a perfect seal with the disc. A channel may be machined into the mask to permit airflow to nearly all areas of the friction surface. Air pressure may be applied to the porous friction surface of the disc through the mating carbon-carbon composite mask. Once the mask is applied and clamped, antioxidant liquid may be applied using a brush or spray or by dipping. As those skilled in the art know, means can be provided to rotate the disc about a horizontal axis if the antioxidant is being applied by dipping in a bath. Preferably, several brake discs are simultaneously immersed and impregnated, each friction face being masked, the discs being disposed coaxially and assembled in a clamping apparatus. Two facing friction faces can be masked using a single plate, which is applied to each of the two friction faces.

At this point, the airflow through the mask against the friction surface of the brake disc will prevent the antioxidant liquid from contacting the friction surface. The rate of airflow may be adjusted for disc size and material properties to assure successful masking. Normally, the airflow will be stopped and the mask removed only after the impregnated antioxidant has dried in and on the carbon-carbon composite friction material. The gas used to maintain pressure may be preheated to speed drying. Desirable gas temperatures may be selected based upon the gas being employed and the length of time desired to dry the coating. Gas temperatures as high as 350° C. have been found to be suitable. Even higher temperatures however may be used.

Impregnating compositions that may be used in this invention may comprise solutions or suspensions. Typical impregnating compositions may comprise, for instance, aqueous solutions of 20–60 wt % $P_2O_5$, 10–30 wt % ZnO, 10–30% $Na_2O$, up to 20 wt % of CuO, CoO, NiO, FeO, MgO, and/or PbO, up to 15 wt % of $Li_2O$ and/or $K_2O$, up to 20 wt % of $Bi_2O_3$, $Al_2O_3$, and/or $B_2O_3$, and up to 5 wt % of $V_2O_5$ and/or $TiO_2$. Other coating materials that may be applied to selected surfaces of a material such as a carbon-carbon composite brake disc by the method of this invention include slurries of ceramic precursors, including (but not limited to) silicon, titanium, or carbon powders. The ceramic precursors would then be reacted to form ceramic coatings in subsequent operations.

Figure 1B:
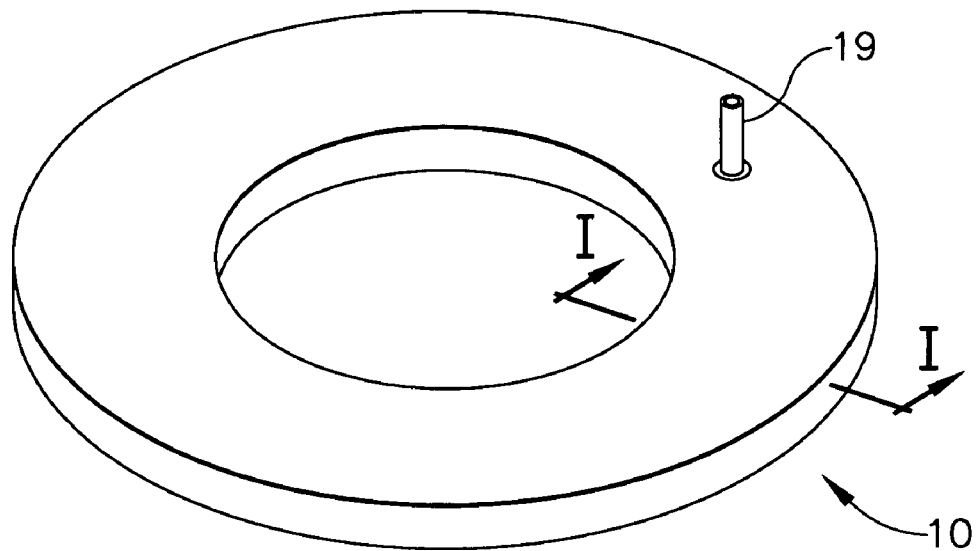

A typical mask piece (10) is shown in FIGS. 1A and 1B. FIG. 1A shows the mating surface of the mask. FIG. 1B shows the outside surface of the mask. A mask for use in the present invention will generally be made of a porous carbon-carbon composite having an open pore structure. It may, however, alternatively be made of a non-reactive porous ceramic material. When the material being treated is porous, the mask need not be porous. FIG. 1A is a bottom perspective view of mask piece (10), in which one can see a channel (12) formed by ridges (11, 13) located at the edges of the annular mask.

The mask may have a pre-drilled hole fitted with inserts that will allow compressed gas to be pumped through it. A gas access port (18) is also shown in FIG. 1A. FIG. 1B shows a top perspective view of mask piece (10). In FIG. 1B, the top surface of the mask is shown as flat. However, it may have any convenient configuration. A gas nozzle (19) that connects to the gas access port is shown in FIG. 1B. In some circumstances, for instance when coating especially large brake discs with antioxidant, it may be desirable to locate more than one gas entry assembly in the mask.

Figure 1C:
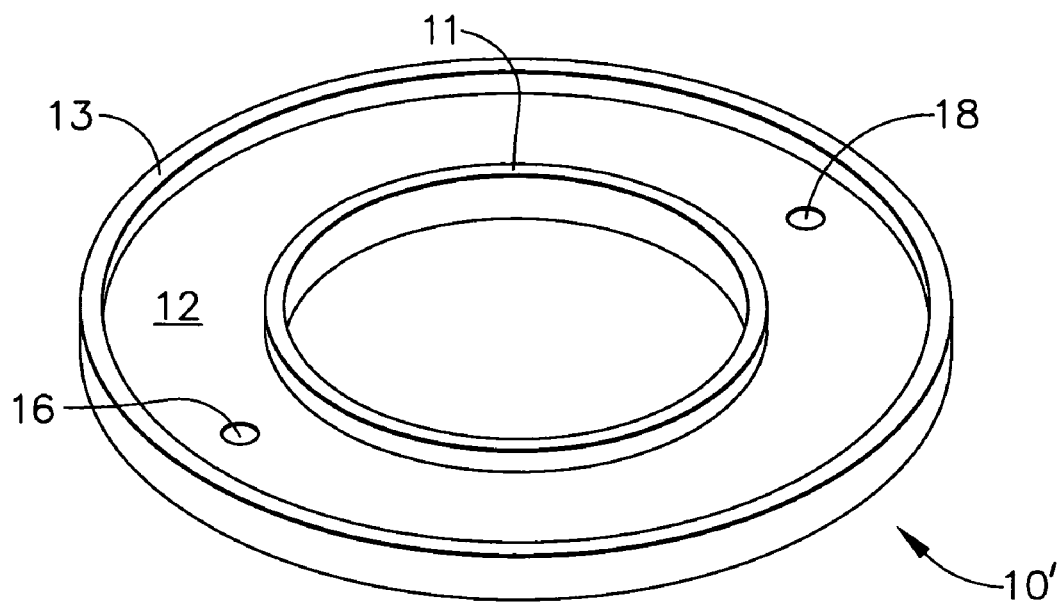
Figure 1D:
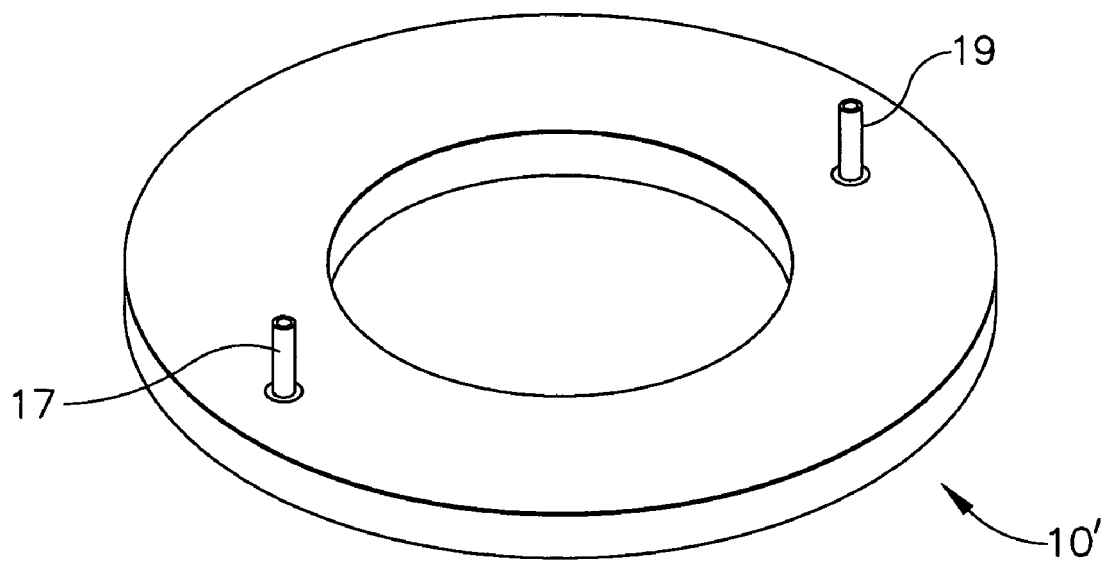

FIGS. 1C and 1D depict an alternative embodiment of the present invention, in which mask (10') is provided with a gas vent port (16) and gas vent nozzle (17). The gas vent nozzle (17) may comprise a valve that is operatively connected to the gas exit port in order to permit restriction of gas flow when pressure within the mask and carbon-carbon composite brake disc falls below a specified minimum value. This gas vent assembly is shown located 180° away from the gas entry assembly. The use of a gas vent assembly in the masks of the present invention allows for much faster gas throughput. It also facilitates recapture of the gas, which may be desirable when the gas is for instance a relatively expensive gas such as argon or helium. Optionally, more than one gas vent assembly may be located in the mask.

Figure 2A:
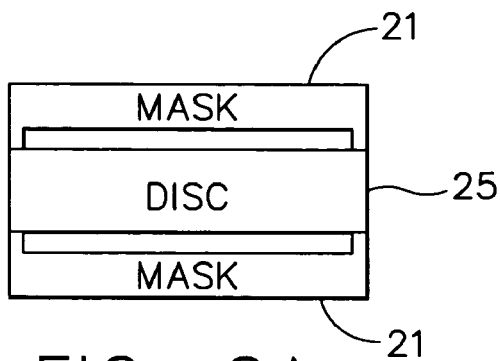
FIGS. 2A, 2B, and 2C show schematic cross-sectional views of various combinations of masks and carbon-carbon composite discs of the present invention.
Figure 2B:
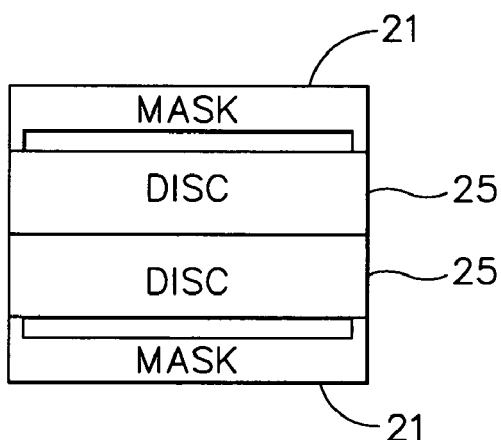
Figure 2C:
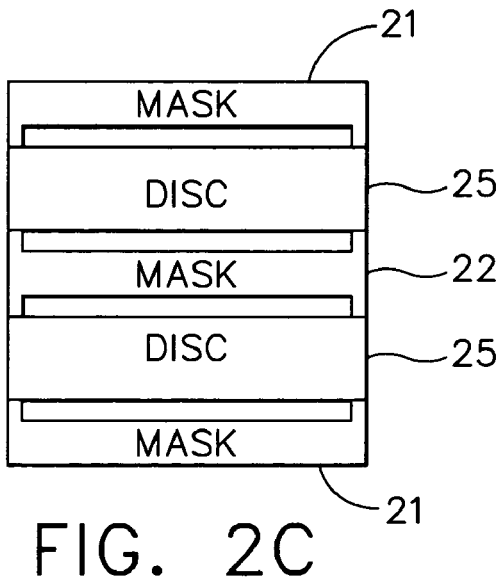

As shown in FIGS. 2A, 2B, and 2C, various combinations of masks and carbon-carbon composite discs may be utilized in the course of implementing the present invention. In FIG. 2A, both the top and the bottom of carbon-carbon composite disc (25) are masked by masks (21, 21). In FIG. 2B, two discs (25, 25) are stacked upon one another, and the top and bottom of the stack are masked by masks (21, 21). In FIG. 2C, two discs (25, 25) are stacked separated by a mask (22) that has an air channel on both sides. The top and bottom of the stack are both masked by single-channel masks (21, 21). The masks in FIGS. 2A–2C, except for the center mask in FIG. 2C, correspond to a cross-section at line I—I in FIGS. 1A and 1B.

The gas generally used in the present invention is air, compressed to less than 20 psi gauge pressure. Lower gauge pressures, e.g. as low as 1 psi, may be used. However, for economic reasons, operation is generally in the range 5–15 psi. It is important that the volume rate of the compressed gas supplied be sufficient to maintain gas velocity through all pores during application of the liquid. The volume rate of gas required will vary considerably based upon the pore size and the pore structure of the mask and the target materials. Generally, the flow rate used in this invention is very high, so that the pressure shows as zero on the gauge regardless of the target pressure at the regulator. Also, since the gas normally cools as it expands, the actual temperature as it enter the apparatus is lower than the initial temperature of the compressed gas used. Air (oxygen) will not oxidize carbon-carbon composites below 300° C. However, any gas that is inert under the conditions of use may be employed in the present invention. Typical inert gases that may be employed include nitrogen, helium, and argon.

It is noted that the present invention does not make use of vacuum and does not involve impregnation of the brake discs being treated. If vacuum were applied to the discs for even a short time while they were in the presence of liquid antioxidant coating, liquid would preferentially reach the friction surfaces. Accordingly, at all times during immersion and until the liquid is dry, the internal gas pressure in the brake discs and in the mask must be higher than ambient pressure. Any impregnation will occur only as incidental impregnation of closed pores that are unaffected by the gas flow.

Figure 3A:
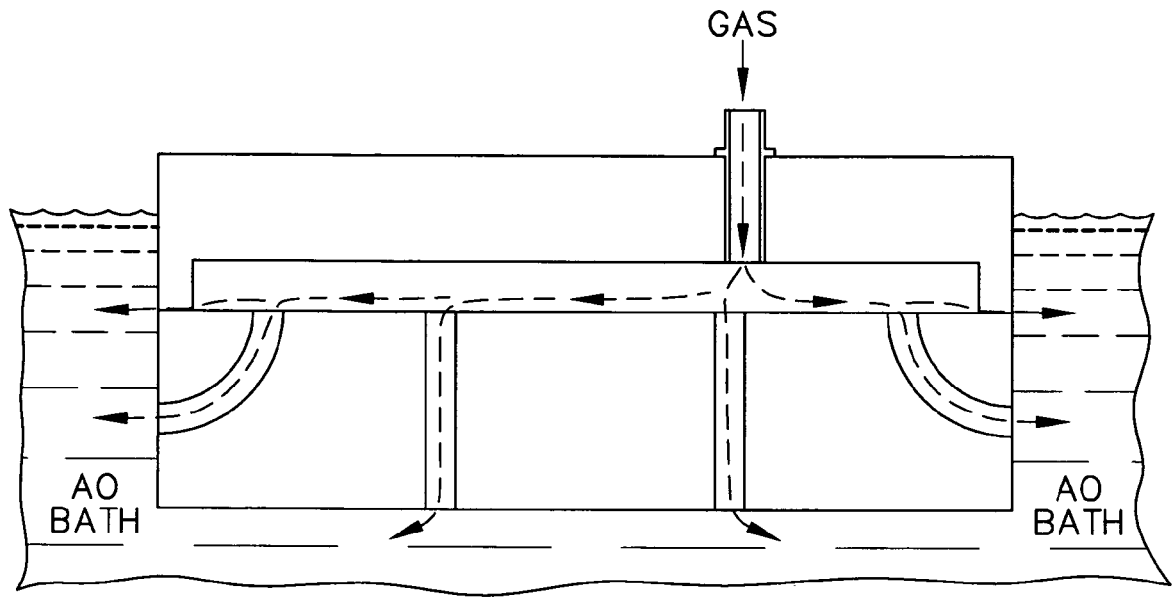
FIG. 3A is a schematic cross-sectional view illustrating the flow of gas in accordance with the present invention.
Figure 3B:
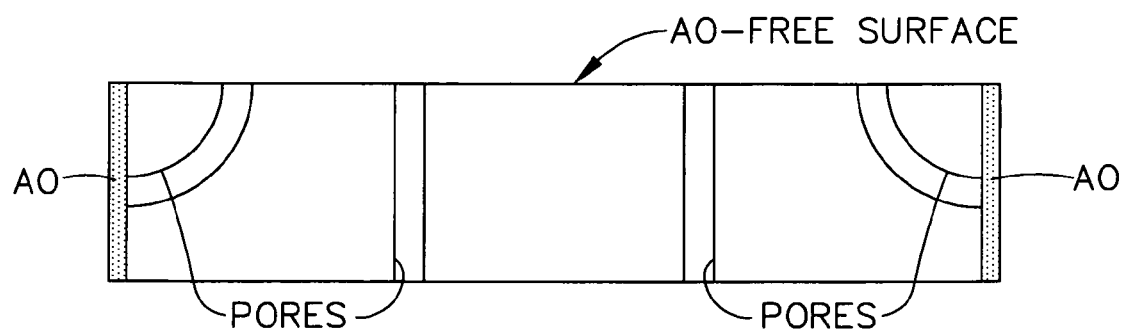
FIG. 3B is a cross-sectional view schematically illustrating a finished product of the present invention.

FIG. 3A illustrates the flow of gas in accordance with the present invention. FIG. 3A shows the bottom of a porous carbon-carbon composite disc, the size of the pores being greatly exaggerated for illustrative purposes. A mask is located on top of the disc. The mask and disc assembly is immersed in an anti-oxidant bath. Compressed gas flows down through the access port in the mask into the channel in the mask. The compressed gas in the channel flows out through the pores in the carbon-carbon composite disc, and also flows out through the interface between the ridges of the mask and the outer edges of the disc. It is this flow of pressurized gas out through the interface between the mask and the disc that prevents coating materials from reaching the surface of the disc covered by the mask. FIG. 3B shows the finished product, a porous carbon-carbon composite disc having anti-oxidant coating its outer and inner sides but being free of anti-oxidant on the surface that was covered with the mask.

Figure 4:
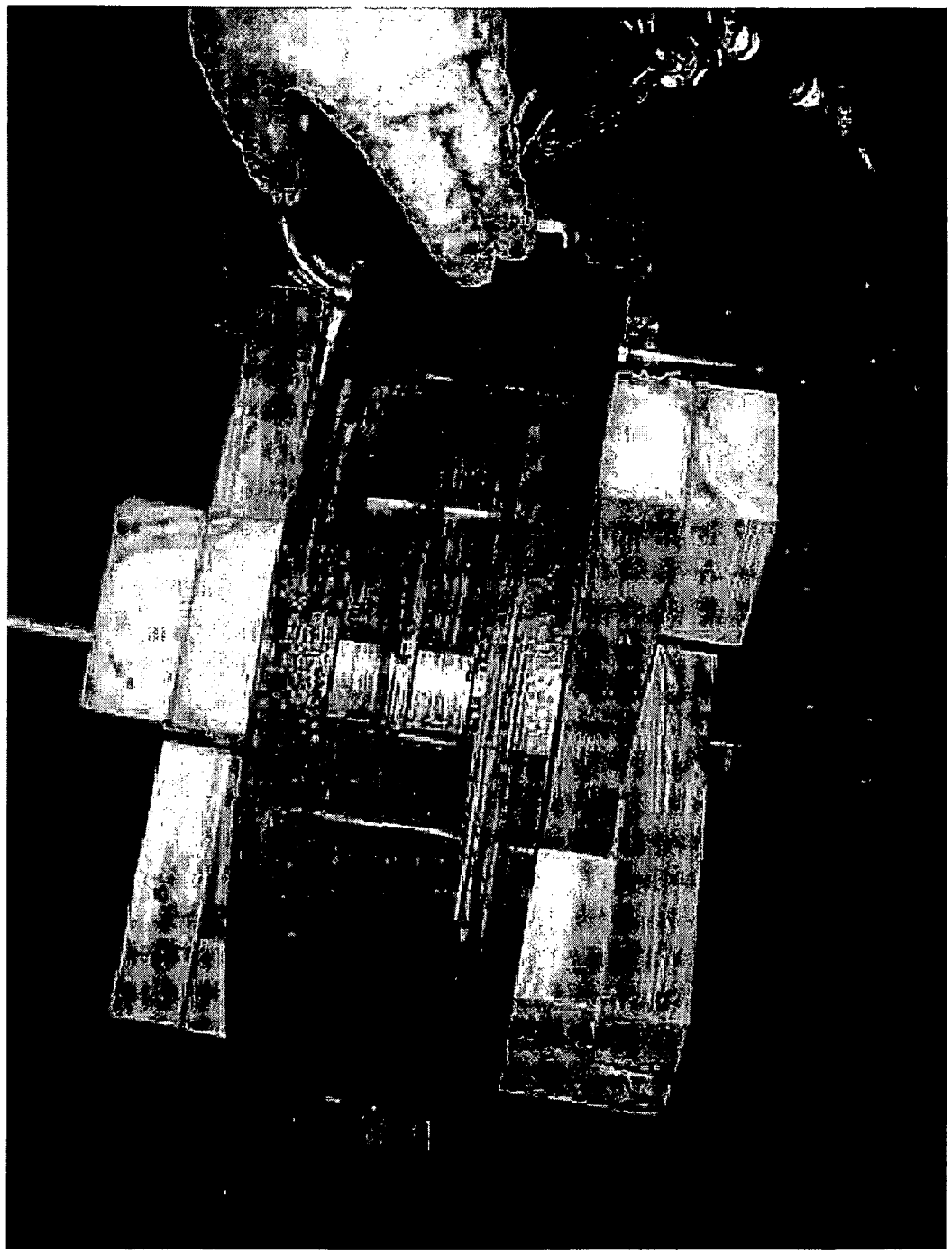
FIG. 4 is a photograph showing carbon-carbon composite discs and masks held together by an external fixture in accordance with the present invention.
Figure 5:
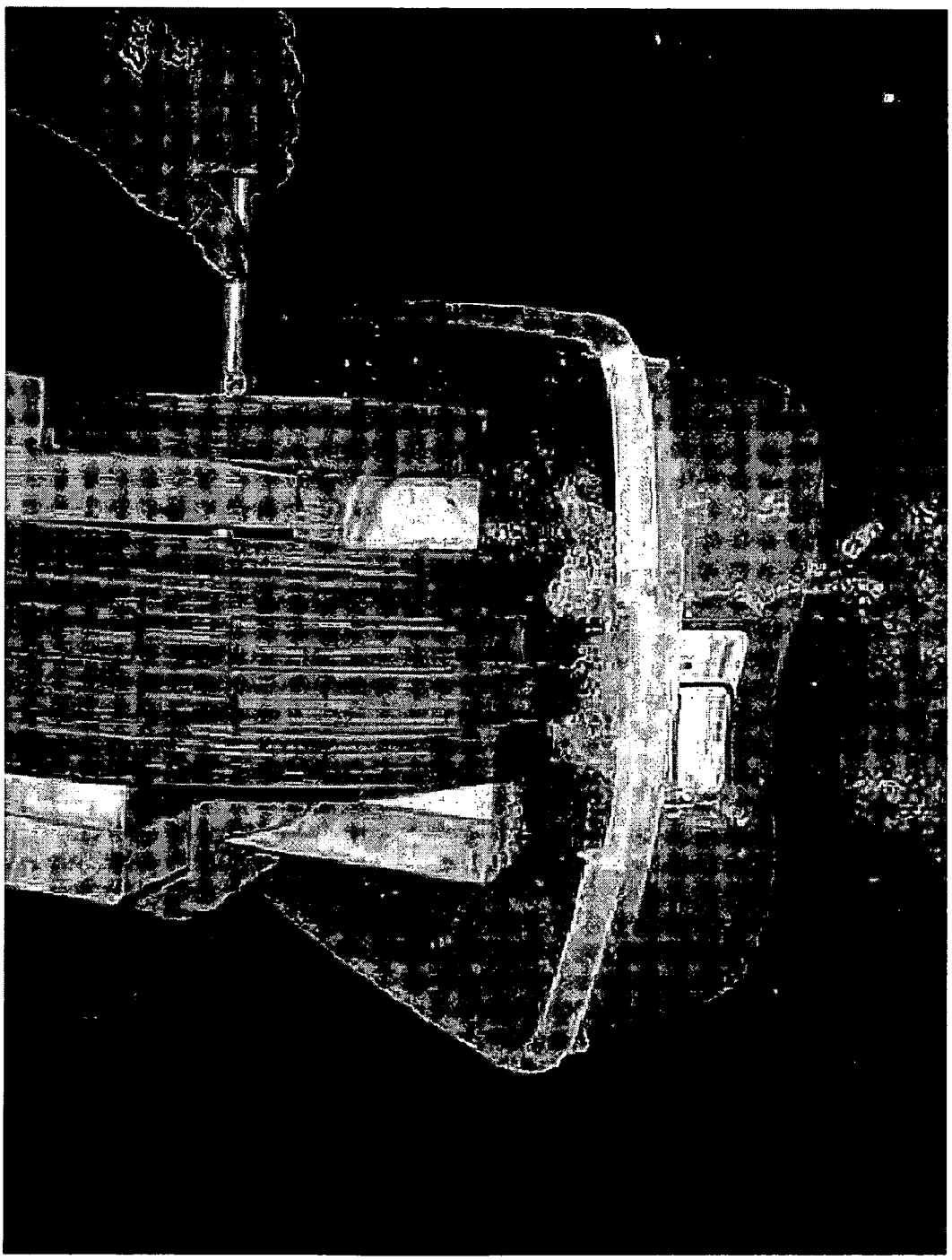
FIG. 5 is a photograph showing immersion of the disc/mask assembly of FIG. 4 in an anti-oxidant bath in accordance with the present invention.

FIGS. 4 and 5 show a disc/mask combination of the type depicted schematically in FIG. 2B. The carbon-carbon composite discs and masks may be held together by an external fixture, such as that shown in FIG. 4. The disc/mask assembly is then dipped and rotated in a bath of anti-oxidant materials as compressed gas is pumped into the assembly. The compressed gas provides sufficient propelling force to prevent the liquid anti-oxidant from being transported to the inside of the assembly and touching or penetrating the friction surfaces. Immersion of the disc/mask assembly in an anti-oxidant bath is illustrated in FIG. 5.

Figure 6:
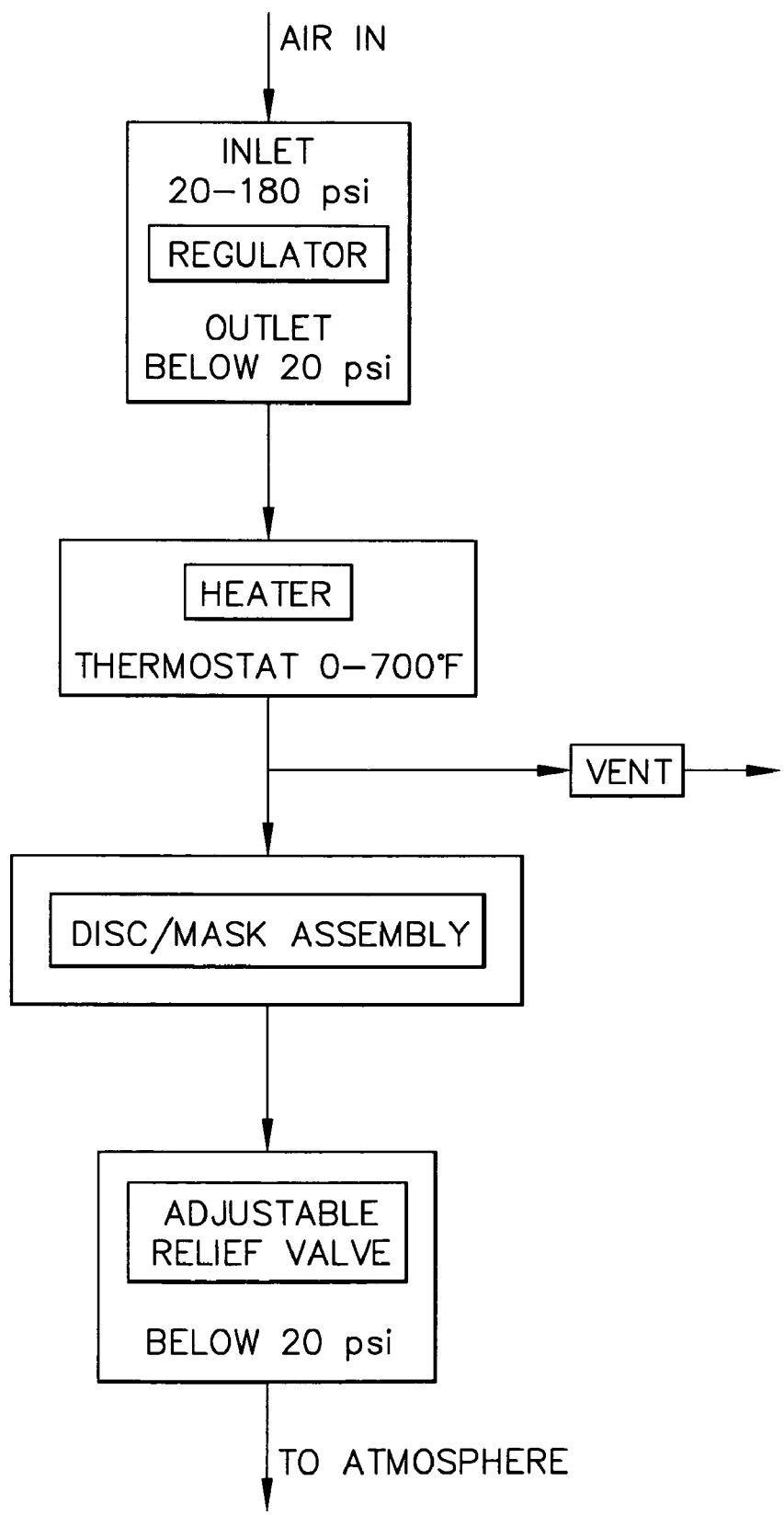
FIG. 6 is a block diagram illustrating overall airflow paths in accordance with an embodiment of the present invention.

FIG. 6 is a block diagram illustrating overall airflow paths in accordance with an embodiment of the present invention. While air is referred to for convenience in this description, those skilled in the art will appreciate that similar considerations apply to other gases which can be used in practicing this invention. Air is supplied to the system at a pressure of 20–180 psi and is regulated to a pressure below 20 psi gauge pressure for use in the process of the invention. The air passes through a heater. The heater has a thermostat permitting temperatures of approximately 0–700° F. (−18 thru 371° C.). Immediately following the heater a small vent to the atmosphere is located to ensure that air flows at all time through the heater and over the thermocouple that controls the heater. This is to ensure that the heater does not self-destruct. Airflow through the heater will be at a rate of, for instance, approximately 0.5 cubic feet per minute. A hose or pipe then passes the hot air into the mask through a gas inlet port. The hot, compressed air in the port escapes through the pores of the porous disc and/or porous mask and also through the interface between the disc and the mask. Optionally, an exit port may be located in the mask. The exit port is generally situated in the mask as far from the inlet port as possible, in order to promote maximum circulation of air within the mask. A relief valve at the exit port, set to a pressure below 20 psi, prevents air from escaping too rapidly. This speeds the drying process. Too rapid voiding of the air would allow the pressure inside the disc/mask assembly to drop, which would lead to expansion of the air and concomitant cooling thereof. This in turn would slow the drying process.

The compressed air or other gas employed in the present invention may be heated to speed up the drying or curing of the liquid coating. It has been found with one embodiment of this invention, for instance, that the drying time is about 25 minutes with unheated air and less than five minutes using air heated to about 325° F. (163° C.) prior to its expansion in the apparatus

EXAMPLE

Stator discs for aircraft brakes are made of carbon-carbon composite material having a residual internal pore space of about 10% by volume. Three discs are assembled coaxially and the friction faces of the discs are masked using annular end plates and an intermediate plate, as illustrated in FIG. 2C herein. The mask plates are formed of carbon-carbon composite having a residual internal pore space of about 10% by volume. The inner and outer diameters of the mask plates used in this invention are about the same as the inner and outer diameters of the stator discs. The discs mounted in the apparatus are immersed in a bath constituted by an aqueous solution of phosphate glass precursors: 39% $H_2PO_4$, 13% $MnPO_4$, 3% KOH, 5% $NaBO_3$, and 40% water. The discs are immersed in the bath for 5 minutes, during which time compressed air at 5 psi gauge pressure and ambient temperature is forced into the mask plates. The coated, masked disc assembly is then removed from the bath and dried at a temperature of about 750° C. Subsequently, the coated brake discs are freed from the apparatus and separated for use in an aircraft landing system.

The amount of anti-oxidant deposited on the surfaces of the porous material may be measured by the weight gain per unit area before and after application. A typical relative weight gain in accordance with this invention is less than 2%, depending on the material used. The present approach matches the results of conventional methods, but is faster and more reliable.

The approach of this invention can be used in many different applications in which a liquid phase material must be applied to selected areas of a solid porous material, regardless of the particular solid and liquid materials involved.

What is claimed is:

1. A method of applying a liquid coating material to only selected surfaces of a solid material, which method comprises the step of applying said liquid coating material to said solid material and subsequently drying the solid material to which the liquid coating material has been applied while directing compressed gas across the surfaces of the solid material that are to be kept free of the coating material by means of a mask composed of porous carbon-carbon composite material, wherein said gas is supplied at a volume-rate sufficient to maintain air velocity through the pores and through an interface between said mask and said solid material during the application and drying of said liquid coating material so as to apply the liquid coating material to only selected surfaces of the solid material.

2. A method of applying a liquid antioxidant coating material to only selected surfaces of a porous carbon-carbon composite brake disc, which method comprises the step of applying said liquid antioxidant coating material to said porous carbon-carbon composite brake disc and subsequently drying the porous carbon-carbon composite brake disc to which the antioxidant has been applied while directing heated compressed gas across the surfaces of the porous carbon-carbon composite brake disc that are to be kept free of the coating material by means of a mask, wherein said gas is supplied at a volume-rate sufficient to maintain air velocity through the pores of the brake disc and through an interface between said mask and said porous carbon-carbon composite brake disc during the application and drying of said liquid antioxidant coating material.

3. The method of claim 2, wherein said gas is supplied at a rate of 0.2–2.0 cubic feet per minute.

4. The method of claim 3, wherein said gas is supplied at a rate of 0.5 cubic feet per minute.

5. The method of claim 1, wherein said mask is composed of porous carbon-carbon composite material.

6. The method of claim 1, wherein said gas is compressed to less than 20 psi gauge pressure.

7. The method of claim 6, wherein said gas is compressed to a gauge pressure of 5–15 psi.

8. The method of claim 1, wherein said compressed gas is heated to a temperature in the range of 100–350° C.

9. A method of avoiding application of liquid antioxidant material to a friction surface of a carbon-carbon composite brake disc, which method comprises the steps of:
   covering said friction surface with a mask configured to cover said friction surface with compressed gas, and
   directing compressed gas across said friction surface and through an interface between said carbon-carbon composite brake disc and said mask and through pores in said carbon-carbon composite brake disc and/or in said mask while the masked brake disc is in the presence of said antioxidant material in a liquid state to avoid application of liquid antioxidant material to said friction surface.

10. The method of claim 9, wherein said gas is directed across said friction surface and through said interface and said pores at a rate of 0.2–2.0 cubic feet per minute.

11. The method of claim 9, comprising the additional step of heating said compressed gas prior to directing it across said friction surface and through said interface and said pores.

12. The method of claim 11, wherein said compressed gas is heated to a temperature in the range of 100–350° C.

13. The method of claim 11, comprising the additional step of reducing the pressure of said gas from a pressure of 20–180 psi to a pressure of less than 20 psi prior to heating said gas.

* * * * *